United States Patent
Naor

(10) Patent No.: US 10,120,851 B2
(45) Date of Patent: Nov. 6, 2018

(54) AUTOMATIC SEMANTIC DATA ENRICHMENT IN A SPREADSHEET

(71) Applicant: Microsoft Technology Licensing, LLC, Redmond, WA (US)

(72) Inventor: Yaniv Naor, Ramat HaSharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/199,531

(22) Filed: Jun. 30, 2016

(65) Prior Publication Data

US 2018/0004722 A1    Jan. 4, 2018

(51) Int. Cl.
G06F 17/00 (2006.01)
G06F 17/24 (2006.01)
G06F 17/30 (2006.01)
G06F 17/27 (2006.01)

(52) U.S. Cl.
CPC ........ *G06F 17/246* (2013.01); *G06F 17/2785* (2013.01); *G06F 17/30011* (2013.01)

(58) Field of Classification Search
CPC .................................................. G06F 17/246
See application file for complete search history.

(56) References Cited

U.S. PATENT DOCUMENTS

| | | | | |
|---|---|---|---|---|
| 6,134,563 A * | 10/2000 | Clancey | ................ | G06F 17/247 706/45 |
| 6,697,999 B1 * | 2/2004 | Breuer | .................... | G06F 17/21 715/236 |
| 7,698,287 B2 * | 4/2010 | Becker | .................. | G06F 17/246 707/999.101 |
| 7,761,782 B1 * | 7/2010 | Warren | ................. | G06F 17/246 715/212 |
| 7,971,134 B2 * | 6/2011 | Bauchot | ................ | G06F 17/246 715/212 |
| 8,103,962 B2 * | 1/2012 | Embley | ................. | G06F 17/243 715/763 |
| 8,407,668 B2 * | 3/2013 | Lindhorst | ........... | G06F 9/45512 717/115 |

(Continued)

OTHER PUBLICATIONS

Lardinois, Frederic, "Google Sheets Gets Smart Autofill to Predict Unknown Values", Published on: Oct. 13, 2014 Available at: http://techcrunch.com/2014/10/13/google-sheets-gets-smart-autofill-to-predict-unknown-values/.

(Continued)

*Primary Examiner* — Laurie A Ries
(74) *Attorney, Agent, or Firm* — Merchant & Gould P.C.

(57) ABSTRACT

To improve efficiency of populating a spreadsheet with data, the system and method disclosed herein provide for a user to request automatic filling of data into the spreadsheet. In one embodiment, the user identifies a target area such as a column of the spreadsheet and existing data items entered by the user are detected in a base column and the target column. In one aspect, a data item in a cell is detected in the target column. In another aspect a column header is detected in the target column. A semantic relationship is determined between the detected data items in the base column and target column. The determined relationship is then used to determine at least one new data item to add to the target area of the spreadsheet.

24 Claims, 7 Drawing Sheets

(56) References Cited

U.S. PATENT DOCUMENTS

| | | | | |
|---|---|---|---|---|
| 9,286,290 | B2* | 3/2016 | Allen | G06F 17/2785 |
| 9,606,978 | B2* | 3/2017 | Byron | G06F 17/27 |
| 9,798,829 | B1* | 10/2017 | Baisley | G06F 17/30958 |
| 2004/0172616 | A1* | 9/2004 | Rothschiller | G06F 17/2247 |
| | | | | 717/114 |
| 2006/0048044 | A1* | 3/2006 | Genesereth | G06F 17/246 |
| | | | | 715/213 |
| 2006/0069696 | A1* | 3/2006 | Becker | G06F 17/246 |
| 2006/0136808 | A1* | 6/2006 | Chirilov | G06F 17/246 |
| | | | | 715/217 |
| 2008/0168341 | A1* | 7/2008 | Payette | G06F 17/246 |
| | | | | 715/212 |
| 2010/0169758 | A1* | 7/2010 | Thomsen | G06F 17/246 |
| | | | | 715/212 |
| 2013/0298002 | A1* | 11/2013 | Viry | G06F 17/246 |
| | | | | 715/220 |
| 2014/0351241 | A1* | 11/2014 | Leask | G06F 17/30958 |
| | | | | 707/722 |
| 2014/0372857 | A1* | 12/2014 | Otero | G06F 17/246 |
| | | | | 715/220 |
| 2015/0378979 | A1* | 12/2015 | Hirzel | G06F 17/5045 |
| | | | | 715/220 |
| 2016/0350369 | A1* | 12/2016 | He | G06F 17/30454 |

OTHER PUBLICATIONS

Vos, et al., "A Methodology for Constructing the Calculation Model of Scientific Spreadsheets", In Proceedings of 8th International Conference on Knowledge Capture, Oct. 7, 2015, 8 pages.

"Fill Data Automatically in Worksheet Cells", Published on: Oct. 1, 2015 Available at: https://support.office.com/en-us/article/Fill-data-automatically-in-worksheet-cells-74e31bdd-d993-45da-aa82-35a236c5b5db.

Hodnigg, et al., "Computational Models of Spreadsheet-Development: Basis for Educational Approaches", In Journal of Computing Research Repository, Jan. 2008, 16 pages.

Tallis, et al., "A Functional Spreadsheet Framework for Authoring Logic Implication Rules", In Proceedings of International RuleML Symposium on Rule Interchange and Applications, Oct. 30, 2008, 4 pages.

* cited by examiner

FIG. 3A

| | A | B | C |
|---|---|---|---|
| 1 | Country | | Currency |
| 2 | USA | | |
| 3 | Spain | | |
| 4 | Italy | | 310 |
| 5 | France | | |
| 6 | Greece | | |
| 7 | Israel | | |
| 8 | Cuba | | |
| 9 | Mexico | | |
| 10 | Belgium | | |
| 11 | Brazil | | |
| 12 | Norway | | |

| | A | B | C |
|---|---|---|---|
| 1 | Country | | Currency |
| 2 | USA | | United States dollar |
| 3 | Spain | | euro |
| 4 | Italy | | euro — 310 |
| 5 | France | | euro |
| 6 | Greece | | euro |
| 7 | Israel | | Israeli new shekel |
| 8 | Cuba | | Cuban peso |
| 9 | Mexico | | Mexican peso |
| 10 | Belgium | | euro |
| 11 | Brazil | | Brazilian real |
| 12 | Norway | | Norwegian krone |

300' — 320

| | A | B | C |
|---|---|---|---|
| 1 | | Country | Currency |
| 2 | Barack Obama | USA | |
| 3 | Francois Hollande | | |
| 4 | Reuven Rivlin | | |
| 5 | Dilma Rousseff | | |

FIG. 4A

| | A | B | C |
|---|---|---|---|
| 1 | | Country | Currency |
| 2 | Barack Obama | USA | |
| 3 | Francois Hollande | France | |
| 4 | Reuven Rivlin | Israel | |
| 5 | Dilma Rousseff | Brazil | |

FIG. 4B

| | A | B | C |
|---|---|---|---|
| 1 | Item | Country | Currency |
| 2 | Barack Obama | USA | US Dollar |
| 3 | Francois Hollande | France | Euro |
| 4 | Reuven Rivlin | Israel | Israeli New Shekel |
| 5 | Dilma Rousseff | Brazil | Brazilian Real |

FIG. 4C

AUTOMATIC SEMANTIC DATA ENRICHMENT IN A SPREADSHEET

BACKGROUND

The direct manual input of data or import of data from an external source such as a database or website into a computerized database or an electronic document such as a spreadsheet can be difficult. Often the data is difficult and cumbersome to find. Even if the desired data is found it often is not organized in a convenient format suitable for analysis. When the data is not organized in a suitable format, scripts are required to be written or other manual transformations are required in order to organize the data into a desired format.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

To improve efficiency of manually inputting and importing data from an external source, examples of recognized relationships from existing data are used for determining which data to automatically enter. The systems and methods disclosed herein detect user intended semantic relationships based on detected examples of existing data. A knowledge graph identifies the relationships found in the existing data. The best user intended semantic relationships are determined from relationships between entries in different table columns. The best matching relationship is then used to automatically fill in the remainder of the values.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3A and 3B illustrate another example spreadsheet and alternative example events resulting in automatic population of a column with data according to at least one aspect disclosed herein;

FIGS. 4A-4C illustrate yet another example spreadsheet and example events resulting in automatic population of multiple columns with data according to at least one aspect disclosed herein;

DETAILED DESCRIPTION

Figure 1:
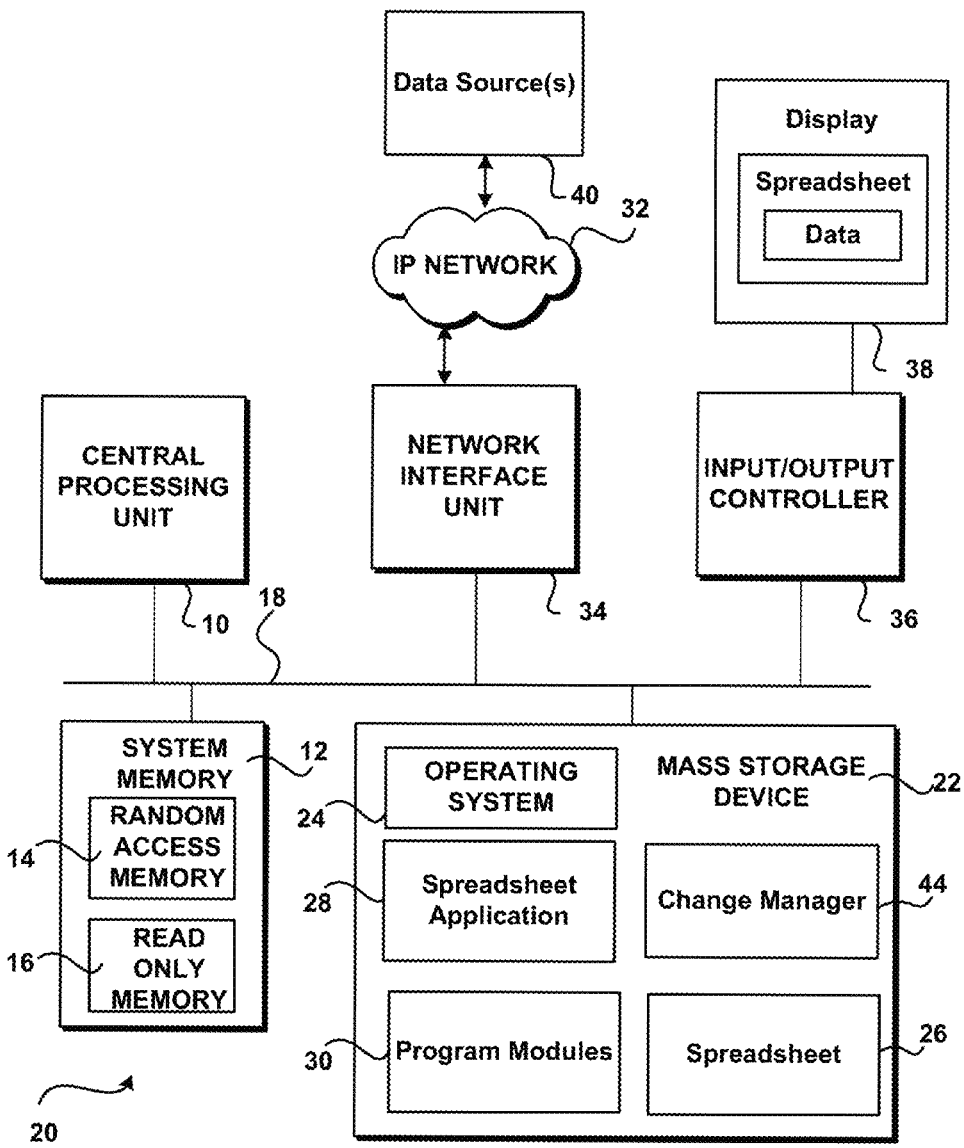
FIG. 1 is an illustration of physical components of a computer environment utilized in the various aspects.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 and the corresponding discussion are intended to provide a brief, general description of a suitable computing environment in which aspects may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Still referring to FIG. 1, an illustrative computer environment for a computer 20 utilized in the various aspects will be described. The computer environment shown in FIG. 1 includes any type of computing device that is configured to perform the operations relating to obtaining data and associating the data with a spreadsheet. For example, some of the computing devices may be: mobile computing devices (e.g. cellular phones, tablets, smart phones, laptops, and the like), desktop computing devices, servers or some other type of computing device, and include a central processing unit 10 ("CPU"), a system memory 12, including a random access memory 14 ("RAM") and a read-only memory ("ROM") 16, and a system bus 18 that couples the memory to the central processing unit ("CPU") 10.

A basic input/output system containing the basic routines that help to transfer information between elements within the computer, such as during startup, is stored in the ROM 16. The computer 20 further includes a mass storage device 22 for storing an operating system 24, spreadsheet 26, spreadsheet application 28 and other program modules 30. The spreadsheet 26 may include one or more sheets in a workbook. The computer 20 also includes a change manager 44 described in detail below. The spreadsheet may be stored on the mass storage device 22 or may be on the cloud and accessible via a web browser.

The mass storage device 22 is connected to the CPU 10 through a mass storage controller (not shown) connected to the bus 18. The mass storage device 22 and its associated computer-readable media provide non-volatile storage for the computer 20. Although the description of computer-readable media contained herein refers to a mass storage device, such as a hard disk or CD-ROM drive, the computer-readable media can be any available media that can be accessed by the computer 20.

By way of example, and not limitation, the term computer readable media as used herein include computer storage media. Computer storage media include volatile and non-volatile, removable and non-removable media implemented in any method or technology for storage of information, such as computer readable instructions, data structures, or program modules. System memory, removable storage devices, and non-removable storage devices are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 20. According to an aspect, any such computer storage media is part of the computing device 20. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Computer 20 operates in a networked environment using logical connections to remote computers through a network 32, such as the Internet. The computer 20 may connect to the network 32 through a network interface unit 34 connected to the bus 18. The network connection may be wireless and/or wired. The network interface unit 34 may also be utilized to connect to other types of networks and remote computer systems. The computer 20 may also include an input/output controller 36 for receiving and processing input from a number of other devices, including a touch surface, keyboard, mouse, or electronic stylus (not shown). Similarly, the input/output controller 36 may provide input/output to a scanner, a camera, a display screen 38, a printer, or other type of input and/or output device. The spreadsheet 26 is configured to integrate data directly input into the spreadsheet 26 or obtained from one or more external sources 40 over a network such as the Internet 32.

As mentioned briefly above, a number of program modules and data files may be stored in the mass storage device 22 and RAM 14 of the computer 20, including an operating system 24 suitable for controlling the operation of a computer, such as the WINDOWS operating system from MICROSOFT CORPORATION of Redmond, Wash. The mass storage device 22 and RAM 14 may also store one or more program modules. In particular, the mass storage device 22 and the RAM 14 may store one or more application programs, including the spreadsheet application 28 and program modules 30. According to an aspect, the spreadsheet application 28 is the MICROSOFT EXCEL spreadsheet application. Other spreadsheet applications may also be used.

Display 38 is configured to display a representation of the data that is obtained from the spreadsheet 26. The data may be included within a display of a spreadsheet and/or used in creating a display of another object. For example, the data obtained from the captured image may be used to create a chart that is displayed, sort a list of values, change formatting of one or more values and the like.

According to an embodiment, a business productivity application, such as spreadsheet application 28, is configured to receive input from a touch-sensitive input display and/or keyboard input (e.g. a physical keyboard and/or SIP) and/or other types of input (e.g. speech and/or some other input sensing). For example, change manager 44 may provide information to the spreadsheet 26 in response to a user's input such as editing a cell, selecting an element to edit a value, and the like. The change may affect one or more portions or pages of the spreadsheet 26. While change manager 44 is shown within mass storage device 22, all/part of the functionality of the change manager 44 may be included elsewhere. For example, one or more programming modules 30 may include the change manager 44.

According to aspects of the present disclosure, while viewing a spreadsheet on a display, based on existing data entered into the spreadsheet by one or more users, the user's intended semantic relationship(s) can be determined by analyzing the existing text in each cell of one or more base columns of the spreadsheet. A semantic relationship is distinguishable from a syntax relationship in that a semantic relationship has to do with the meaning of the text whereas a syntax relationship has to do with the form and order of text.

The user can invoke automatic data fill to a target area of the spreadsheet by detecting values in a base area of the spreadsheet by making a selection such as pressing a button on a tool bar of the spreadsheet. Alternatively, the automatic data fill to a target area may be suggested to the user automatically. For example, automatic data fill to a target column may be invoked when the user types in sample values in cells of the target column or types in a column header for the target column as explained in greater detail below. Upon determining the user's intended relationship between the existing data of the base column and either the sample values or the header of the target column, new data will be determined for filling the remainder of the missing values of the target column of the spreadsheet based on the determination of the user's intended relationship.

An understanding of the user's intended semantic relationship based on existing data in the spreadsheet can be obtained by using a knowledge graph or a structured knowledge base. Knowledge graphs, also known as entity graphs, include semantic search information collected from a wide variety of sources. Examples of knowledge graphs include, but are not limited to, Bing Satori®, Google Knowledge Graph®, Wikidata®, DBpedia® and Freebase®. The knowledge graph is integrated to the spreadsheet application 28 as a source for determining semantic relationships between the existing data of the base column of the spreadsheet 26 and either sample data or a column header of the target column of the spreadsheet 26. In other words, analysis of the existing data of the spreadsheet 26 yields one or more sematic relationships from the source of the knowledge graph. Upon determining one or more semantic relationships, data missing from the target column can be determined.

In one or more aspects, rather than simply inserting new data into empty cells of a target column of a spreadsheet, the new data items determined with the user of a semantic relationship may replace some or all of the existing data in the target column. For example, using the column header of the target column with the existing data of the base column to determine the semantic relationship, new data items can be determined in order to replace any existing data items in the target column under the column header. Also, when cells of the target column are inserted with new data based on the semantic relationship with the base column, one or more, but not all, of the existing items of the base column may be replaced if incorrect based on the semantic relationship being used.

In one or more aspects, the new data items to be entered into a target column may be dynamic data items. For example, one or more data items determined with the user of a semantic relationship for a target column may be formulas for performing calculations involving other data items within the columns of the spreadsheet including the base and target columns. The dynamicity could include the semantic relationship itself or just the populated value. For example, a formula may be:

```
=RELATED("Currency of", "USA")
Or
=RELATED("CURRENCY of", @BaseColumn)
Or
=DETECT.RELATED(@TargetColumn,@BaseColumn)
```

In the last case, the optional semantic relationship would be calculated again on any change of value in the target/base column.

Rather than obtaining a predefined table of data, with a combination of columns, the determined semantic relationship is used to determine each individual missing data item for the target column. The missing data may be obtained from the spreadsheet application 28, the computer 20, from the knowledge graph, or from one or more other external data sources 40. A search of the one or more external data sources 40, the spreadsheet 26, and/or the computer 20 itself may be performed to determine new data items to auto-fill the target area of the spreadsheet based on the relationship determined from the knowledge graph. Also, the new data for the target column may be internal corporate data or publicly available data. Upon identifying the new data for the target area, the new data may be automatically formatted via the change manager 44 to correspond with the existing data items in the base or target areas of the spreadsheet 26. Once the new data items are reformatted, they may be entered into target area of the spreadsheet 26 by the change manager 44.

FIGS. 2A, 2B, 3A, 3B, 4A, 4B and 4C show example scenarios that illustrate using existing data from a base area of a spreadsheet to determine a relationship to automatically fill a target area of the spreadsheet. For example, data in a base column of the spreadsheet may be used to determine a semantic relationship for determining new data to automatically populate a target column of the spreadsheet. In one or more aspects, the target column may be next to or adjacent to the base column or may be positioned two or more columns away from one another. Also, in one or more aspects, the multiple base columns and multiple target columns may be used to determine one or more semantic relationships. Also, multiple target columns may be populated simultaneously using different semantic relationships.

Figure 2B:
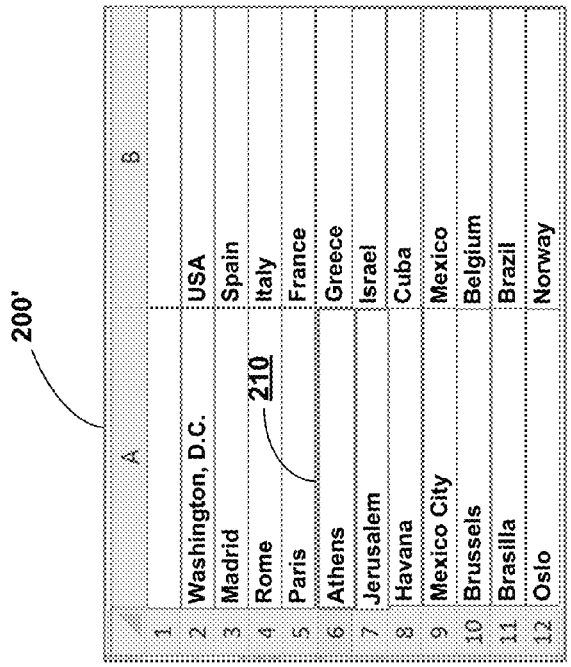
FIGS. 2A and 2B illustrate an example spreadsheet and example events resulting in automatic population of a column with data according to at least one aspect disclosed herein.
Figure 2A:
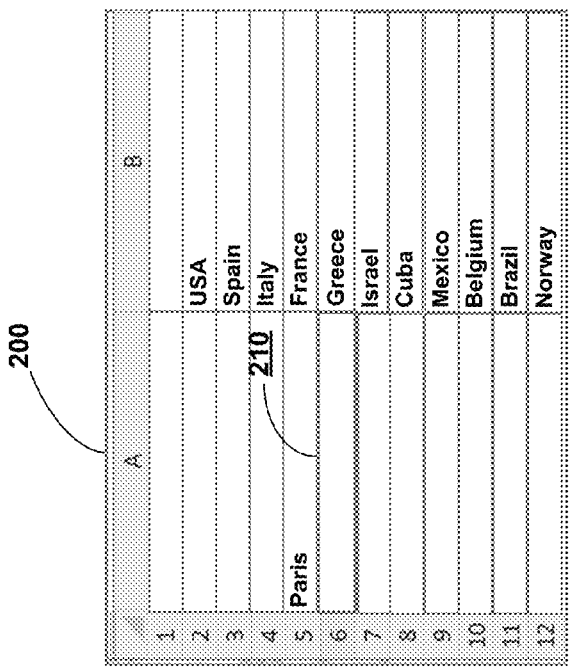

FIG. 2A illustrates an example spreadsheet 200 having two vertical columns. Columns A and B of spreadsheet 200 may include column headers but none are shown in FIG. 2A. Column A does include one cell containing "Paris" and column B includes multiple data items corresponding with various countries. For example, Column B begins with "USA" and also includes "France," "Greece" and other countries.

In an aspect, the user invokes the auto-fill feature and selects column A as the target column by selecting an active cell without data in column A. Column A includes empty active cell 210 as indicted by a darkened border surrounding the cell 210. Thus, the active cell 210 as the target is a determinable property of the corresponding cell of base column B. The determinable property is a constant throughout the spreadsheet 200 relative to columns A and B. In other words, the value within a cell of base column B has a relationship in their semantic meaning in the knowledge graph to the cell in the same row which contains data in column A. In spreadsheet 200, one cell includes "Paris." The semantic relationship between the cell having "Paris" in target column A and the cell in base column B having "France," which are in the same table row, can be determined from the knowledge graph. The knowledge graph determines that the semantic relationship between "Paris" and "France" is that Paris is the capital of France.

In response to determining the relationship is capitals of countries, the capitals of the other countries listed in base column can be determined. FIG. 2B illustrates spreadsheet 200' with the same columns A and B as spreadsheet 200. In spreadsheet 200', target column A includes new data items entered by the change manager 44. The new data items added to the empty cells of target column A of spreadsheet 200' are the capitals of the countries listed in base column B that were discovered based on the semantic relationship provided by the knowledge graph from the cell having "Paris" in target column A and the cell having "France" in base column B of spreadsheet 200. Each of the countries listed in base column B were searched in the knowledge graph for their capitals. The results may be suggested to the user and the user then may select to include the new data items within the cells of the target column. Also, the new data items may be automatically added to the target column.

Alternatively, a column header of target column may be used for determining a semantic relationship with entries in a base column of a spreadsheet. FIG. 3A illustrates a spreadsheet 300 having base column B and a target column C. The active cell 310 indicates column C is the target column. Base column B includes a list of countries and target column C includes a column header 320. The column header 320 is "Currency." Using the knowledge graph, a semantic relationship between the column header 320 of "Currency" and the list of countries of base column B can be determined. "Currency" is the common property of the countries listed in base column B. Thus, new data items corresponding with the currency of each of the listed countries can be determined. Each of the countries listed in base column B were searched in the knowledge graph for their corresponding currencies. The results may be suggested to the user and the user then may select to include the new data items with the cells of the target column. Alternatively, the new data items may be automatically added to the target column.

FIGS. 4A-4C illustrate another example spreadsheet 400 having three vertical columns which may be used to auto-fill the spreadsheet 400 with missing values. Column A may initially be a base column and column B may initially be the target column. Column B of spreadsheet 400 is designated the target column as a result of selecting cell 410 as the active cell. Alternatively, the column header "Country" of column B may have been selected to indicate that column B is the target column. Upon invoking auto-fill, values for the empty cells of column B may be determined by determining the semantic relationship between the text "USA" in cell 410 of column B and the text "Barack Obama" in the adjacent cell of column A. The relationship can be determined from the relationship graph that Barack Obama is the head of state of the USA. Thus, using the list of names in the cells of column A and the head of state as the common principle between columns A and B, the country for each of the corresponding names can be identified for each of the cells of column B. The results may be suggested to the user or the new data items may be automatically added to target column B. For example, column B is updated to include the list of countries as shown spreadsheet 400' of FIG. 4B.

FIG. 4B may be used to illustrate that column B, having previously been the target column, may also become the base column as a result of having been updated to include the list of countries. In such case, FIG. 4B shows that the column header 420 of "Currency" of column C is active in spreadsheet 400' which makes column C, with the missing cell values, the target column. Utilizing the knowledge graph, it can be determined that the semantic relationship between the column header 420 "Currency" and the list of countries of base column B can be determined. In one or more aspects, multiple base columns such as both columns A and B may be used along with a target column to determine one or more semantic relationships.

Still referring to FIG. 4B, "Currency" is the common property of the countries listed in base column B and new data items corresponding with the currency of each of the listed countries can be determined. Each of the countries listed in base column B is searched in the knowledge graph for a corresponding currency. The results may be suggested to the user or the new data items may be automatically added to target column C. For example, spreadsheet 400" of FIG. 4C is an updated version of spreadsheet 400' of FIG. 4B where the cells of target column C are filled in with the particular currency for each country listed in column B.

Figure 5:
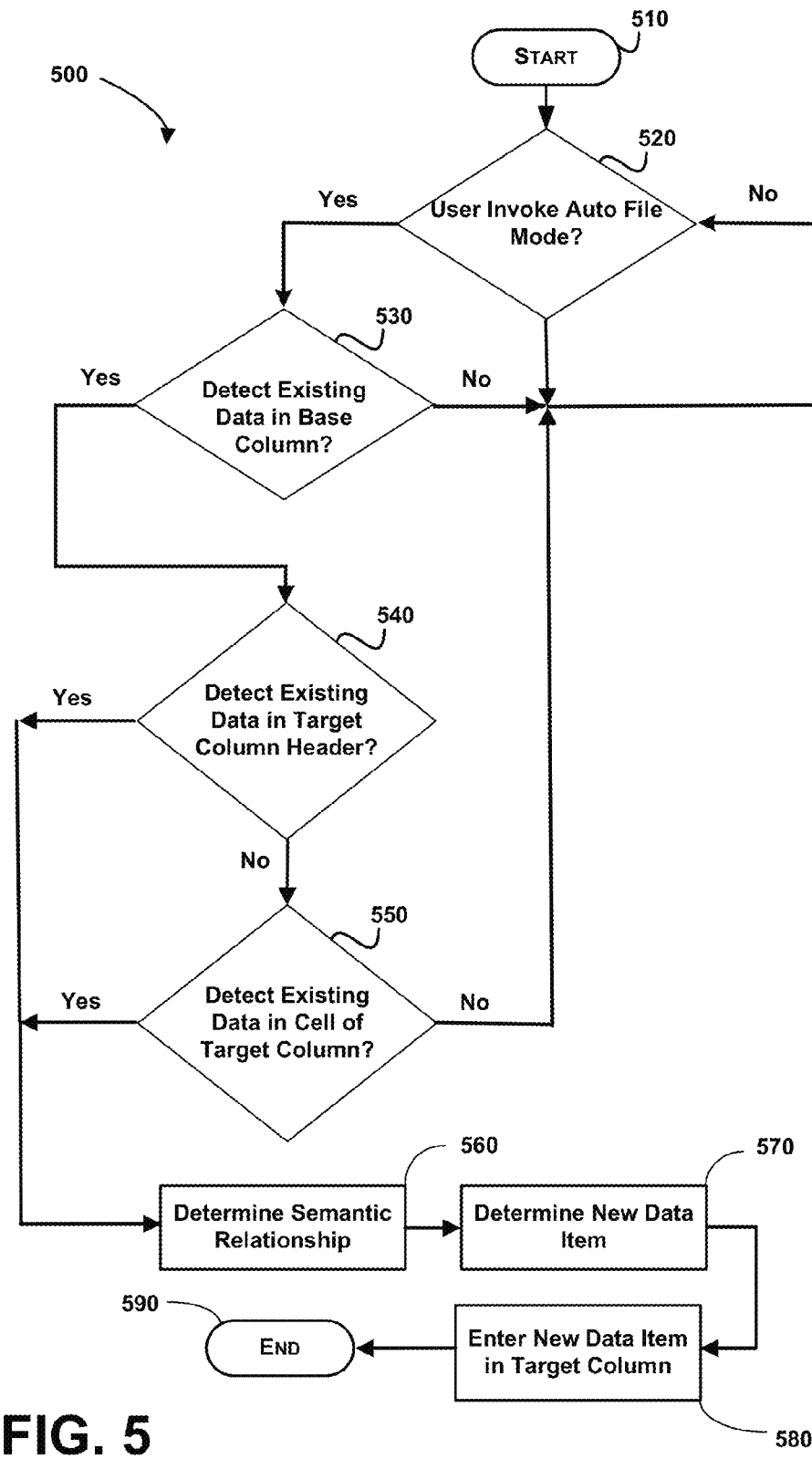
FIG. 5 is a flowchart showing general stages involved in an example method for automatically populating a spreadsheet based on recognized relationships with existing data of a spreadsheet according to at least one aspect disclosed herein.

FIG. 5 is a flowchart showing general stages involved in an example method for automatically populating a spreadsheet based on recognized relationships with existing data of a spreadsheet according to at least one aspect disclosed herein. FIG. 5 illustrates one aspect of a process 500 for improving efficiency in populating a spreadsheet with data. When reading the discussion of the routines presented herein, it should be appreciated that the logical operations of various aspects are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the aspects described herein are referred to variously as operations, structural devices, acts or modules. These operations, structural devices, acts and modules may be implemented in software, in firmware, in special purpose digital logic, and any combination thereof.

After a start operation 510, the process moves to decision operation 520 for determining whether the user has invoked the auto-fill mode for use with a spreadsheet. The user could invoke this action by selecting a button in the tool bar of the spreadsheet or the action could be suggested by the spreadsheet application to the user as the user types in values in the target column or a column header. In the latter case, the detection flow may execute before the action is suggested to the user and the suggestion may already include the fill results. The Yes branch may be followed from decision operation 520 to decision operation 530 for detecting existing data entered by the user in a base column of the spreadsheet. If existing data is detected in a base column, the process continues to decision operation 540. At decision operation 540 a determination is made whether existing data entered by the user existing in a target column header. If a column header is entered in the target column by the user, the process continues to process operation 560. Alternatively, if the user has not entered a column header in the target column, then the process continues to decision operation 550 for determining whether data entered by the user exists in a cell of the target column. In such case, the process then also continues to operation 560. In one or more embodiments, both the column header and data in the cells of the target column could be used together to pick the best matching semantic relationship.

At process operation 560 the semantic relationship between the values in the cells of the base column and either the column header of the target column or a value entered into a cell of the target column is determined from the knowledge graph. The process operation 560 is explained in greater detail in FIG. 6 which is described below.

Moving to operation 570, new data items for the empty cells of the target column are determined with the use of the semantic relationship between the base column and the information entered into the target column. At process operation 580 new data is entered into the empty cells of the target column. Entering the new data may be suggested to the user or the new data may be automatically entered upon determining the semantic relationship. Process 500 then flows to end operation 590 to exit the auto-fill mode.

Figure 6:
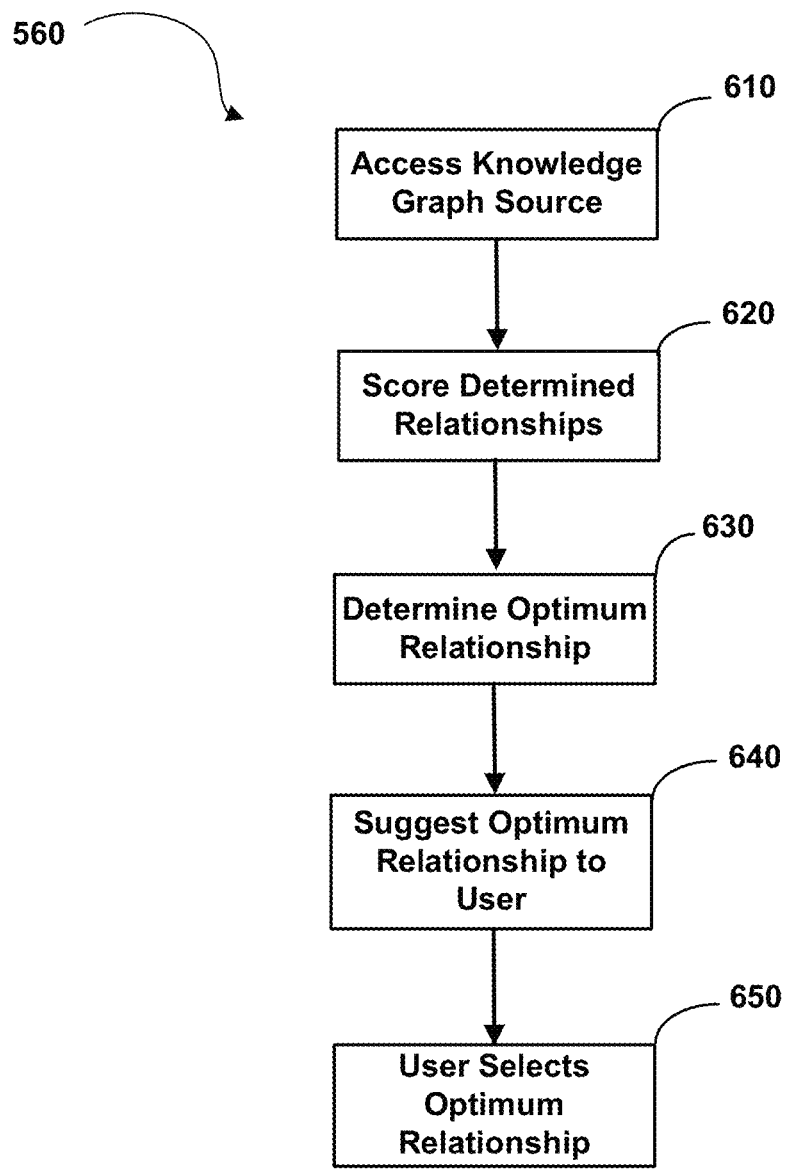
FIG. 6 is a flowchart showing general stages involved in an example method for determining a semantic relationship for the method of FIG. 5 according to at least one aspect disclosed herein.

FIG. 6 is a flowchart showing general stages involved in process operation 560 of FIG. 5. The operation 560 includes process operation 610. At process operation 610 the knowledge graph is accessed to determine the semantic relationship. However, in some aspects, multiple sematic relationships may be retuned in the results. For each of the returned sematic relationships a score may be calculated as shown in process operation 620 to determine the best sematic relationship. Scores may be based on the order of the results, the popularity of particular results, and/or the language associated with particular results, as well as based on other parameters. If there are multiple cells with existing data in the target column, then a different semantic relationship may be found for each where higher scores would be given to the semantic relationships that had the most matches. Also, for example, the number of social network items associated with a relationship can affect the strength of the relationship and therefore its score. Based on the score, the optimum semantic relationship can be determined as shown in process operation 630.

Operation 560 may optionally include operations 640 and 650. Thus, the process may continue to operation 640 where one or more relationships with the highest scores or the optimum relationship is suggested to the user. The user can then accept or reject the suggested relationships including the optimum relationship as shown in process operation 650. Following process operation 650, the process returns to process operation 570 of FIG. 5 for determining the new data with the use of the optimum semantic relationship and to processing other actions.

According to another embodiment, a method for improving efficiency in populating a spreadsheet with data is provided. The method includes detecting existing data items having been entered by one or more users into a base column and having been entered into at least one cell of a target column and a column header of the target column. The method also includes determining a semantic relationship between at least one existing data item of the base column and the existing data item of at least one cell of the target column and another semantic relationship between the at least one existing data item of the base column and the column header. Then the method includes determining at least one new data item to add to the target area of the spreadsheet based on the determined semantic relationships.

In another embodiment, a method for improving efficiency in populating a spreadsheet with data is provided. The method includes detecting existing data items having been entered by a user into a base column of the spreadsheet and then suggesting at least one semantic relationship based on at least one existing data item of the base column. The target column of the spreadsheet may be empty. The sematic relationships may be suggested based on data within the row of cells of the base column itself, on data elsewhere in the spreadsheet other than the target column, or based on sematic relationships typically utilized with the data items of the base column. The method also includes receiving a selection of at least one suggested sematic relationship and then populating the target column with at least one new data item based on the selected at least one sematic relationship.

Figure 7:
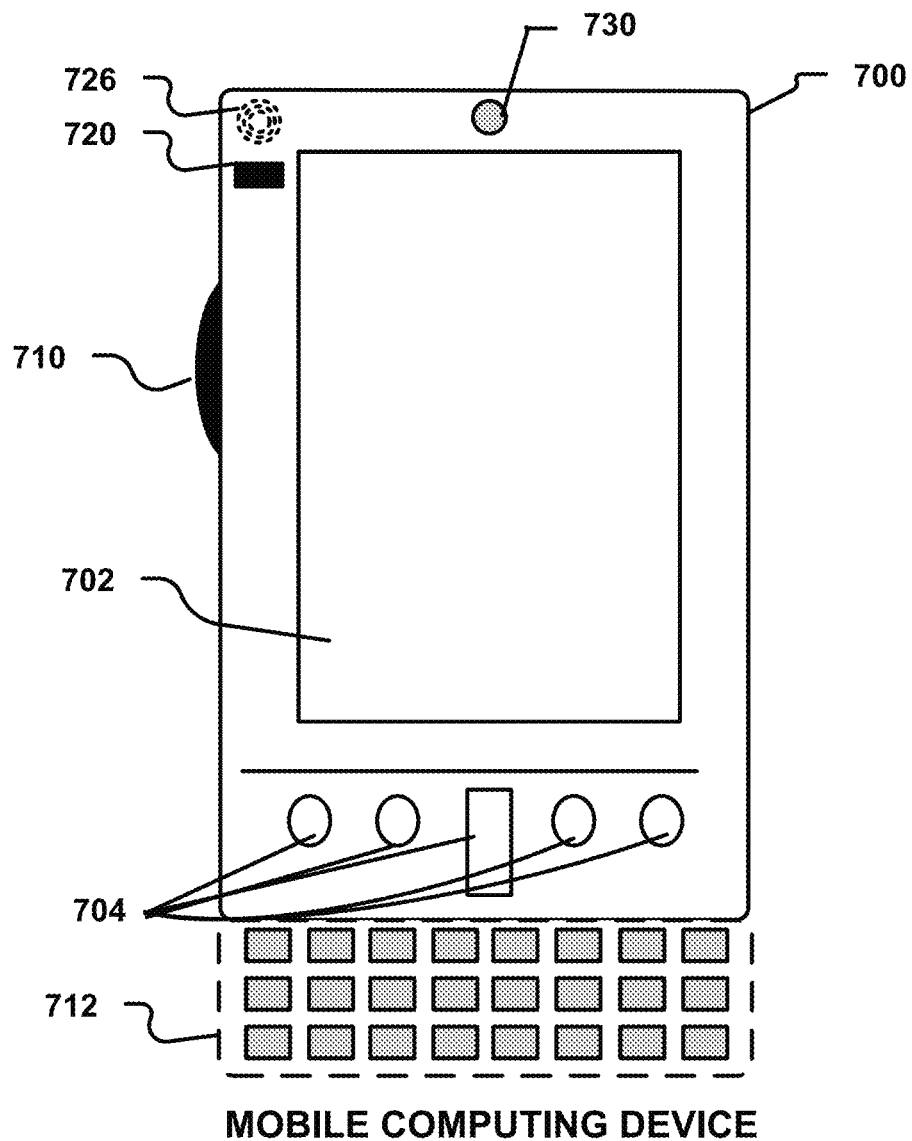
FIG. 7 illustrates operation diagrams of a mobile computing device according to at least one aspect disclosed herein.

The examples described above may be practiced in a variety of operating environments. However, the devices and systems illustrated and discussed herein are for purposes of example and illustration and are therefore not limiting. Nevertheless, FIG. 7 illustrates a mobile computing device 700, for example, a mobile telephone, a smart phone, a tablet personal computer, a laptop computer, and the like, with which aspects described herein may be practiced. The mobile computing device 700 incorporates all or part of the computer 20 of the computer environment system of FIG. 1 to run one or more applications, such as the spreadsheet application 28, in order to implement the examples described herein.

In a basic configuration, the mobile computing device 700 is a handheld computer having both input elements and output elements. The mobile computing device 700 typically includes a display 702 and one or more input buttons 704 that allow the user to enter information into the mobile computing device 700. According to an aspect, the display 702 of the mobile computing device 700 functions as an input device (e.g., a touch screen display). If included, an optional side input element 710 allows further user input. According to an aspect, the side input element 710 is a rotary switch, a button, or any other type of manual input element. In alternative examples, mobile computing device 700 incorporates more or fewer input elements. For example, the display 702 may not be a touch screen in some examples. In alternative examples, the mobile computing device 700 is a portable phone system, such as a cellular phone. According to an aspect, the mobile computing device 700 includes an optional keypad 712. According to an aspect, the optional keypad 712 is a physical keypad. According to another aspect, the optional keypad 712 is a "soft" keypad generated on the touch screen display. In various aspects, the output elements include the display 702 for showing a graphical user interface (GUI), a visual indicator 720 (e.g., a light emitting diode), and/or an audio transducer 726 (e.g., a speaker). In some examples, the mobile computing device 700 incorporates a vibration transducer for providing the user with tactile feedback. In yet another example, the mobile computing device 700 incorporates a peripheral device port 730, such as an audio input (e.g., a microphone jack), an audio output (e.g., a headphone jack), and a video output (e.g., a HDMI port) for sending signals to or receiving signals from an external device.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A computer-implemented method for improving efficiency in populating a spreadsheet with data, comprising:
    detecting existing data items having been entered by a user into a base area and a target area of the spreadsheet;
    determining a semantic relationship between at least one existing data item of the base area and at least one existing data item of the target area of the spreadsheet;
    determining at least one new data item to add to the target area of the spreadsheet based on the determined semantic relationship, wherein the determined at least one new data item has a semantic relationship with another existing data item of the base area that is the same as the semantic relationship between the at least one existing data item of the base area and the at least one existing data item of the target area; and
    populating the target area with the at least one new data item.

2. The computer-implemented method of claim 1, wherein determining a relationship between at least one existing data item of the base area and at least one existing data item of the target area of the spreadsheet comprises determining a semantic relationship between existing data items of a base column of the spreadsheet and at least one existing data item of a target column of the spreadsheet.

3. The computer-implemented method of claim 1, wherein determining a relationship between at least one existing data item of the base area and at least one existing data item of the target area of the spreadsheet comprises determining a semantic relationship between existing data items of a base column of the spreadsheet and a column header of a target column of the spreadsheet.

4. The computer-implemented method of claim 1, further comprising identifying the target area of the spreadsheet by selecting an active cell of the spreadsheet.

5. The computer-implemented method of claim 1, further comprising suggesting the at least one new data item to the user for populating the target area of the spreadsheet.

6. The computer-implemented method of claim 1, populating the at least one new data item into the target area of the spreadsheet comprises automatically populating the at least one new data item into the target area of the spreadsheet.

7. The computer-implemented method of claim 1, wherein determining a relationship between at least one existing data item of the base area and at least one existing data item of the target area of the spreadsheet comprises utilizing a knowledge graph to semantically determine the relationship between at least one existing data item of the base area and at least one existing data item of the target area of the spreadsheet.

8. The computer-implemented method of claim 1, further comprising automatically formatting the new data item to correspond with the at least one existing data item of the target area.

9. The computer-implemented method of claim 1, further comprising receiving the at least one new data item from an external data source.

10. The computer-implemented method of claim 1, wherein determining a relationship between at least one existing data item of the base area and at least one existing data item of the target area of the spreadsheet comprises determining a plurality of relationships between a plurality of existing data items of the base area and at least one existing data item of the target area.

11. The computer-implemented method of claim 10, further comprising calculating a score for each of the plurality of relationships to determine an optimal relationship, wherein the optimal relationship is utilized to determine the at least one new data item to add to the target area of the spreadsheet.

12. The computer-implemented method of claim 10, further comprising the user receiving a selection of one of the plurality of relationships for determining the at least one new data item to add to the target area of the spreadsheet.

13. The computer-implemented method of claim 1, further comprising performing a search of at least one external source in order to determine the at least one new data item to add to the target area of the spreadsheet based on the determined relationship.

14. The computer-implemented method of claim 1, further comprising receiving an indication from a user of the spreadsheet requesting data items for automatically populating the target area of the spreadsheet.

15. A computer-readable medium storing computer-executable instructions for automatically populating a spreadsheet, comprising:
  detecting existing data items entered by a user into a base column and a target column of the spreadsheet;
  determining a semantic relationship between at least one existing data item of the base column and at least one existing data item of the target column of the spreadsheet;
  determining at least one new data item to add to the target column of the spreadsheet based on the determined semantic relationship, wherein the determined at least one new data item has semantic relationship with another existing data item of the base column that is the same as the semantic relationship between the at least one existing data item of the base column and the at least one existing data item of the target column; and
  populating the target column with the at least one new data item.

16. The computer-readable medium of claim 15, wherein determining a relationship between at least one existing data item of the base column and at least one existing data item of the target column of the spreadsheet comprises determining a relationship between existing data items of the base column of the spreadsheet and a column header of the target column of the spreadsheet.

17. The computer-readable medium of claim 15, further comprising suggesting the at least one new data item to the user and receiving an indication from the user to populate the at least one new data item into the target column of the spreadsheet.

18. The computer-readable medium of claim 15, further comprising receiving an indication from the user of the spreadsheet requesting data items for automatically populating the target column of the spreadsheet.

19. The computer-readable medium of claim 15, wherein determining the semantic relationship between the at least one existing data item of the base column and the at least one existing data item of the target column of the spreadsheet comprises determining a semantic relationship between at least one existing data item of the base column and at least one existing data item in a cell of the target column of the spreadsheet.

20. A system for improving efficiency in populating a spreadsheet with data, comprising:
  a processor and memory;
  an operating environment executing using the processor; and
  a change manager that is configured to perform actions comprising:
    displaying a spreadsheet having a grid of rows and columns;
    detecting existing data items entered by the user into one or more base columns and one or more target columns of the spreadsheet;
    determining at least one semantic relationship between at least one existing data item of the base column and at least one existing data item of the target column of the spreadsheet, wherein the at least one existing data item of the target column is either a column header or an existing data item of at least one cell of the target column;
    determining at least one new data item to add to the target column of the spreadsheet based on the determined semantic relationship, wherein the determined at least one new data item has a semantic relationship with another existing data item of the base column that is the same as the semantic relationship between the at least one existing data item of the base column and the at least one existing data item of the target column;
    suggesting the at least one new data item to the user; and
    receiving an indication from the user to enter the at least one new data item into the target column of the spreadsheet.

21. The system of claim 20 wherein the at least one existing data item of the target column is both the column header of the target column and at least one cell of the target column, and determining at least one semantic relationship comprising determining a semantic relationship between the at least one existing data item of the base column and the header of the target column and another semantic relationship between the at least one existing data item of the base column and at least one existing data item of the target column.

22. A method for improving efficiency in populating a spreadsheet with data, comprising:
   detecting existing data items having been entered by one or more users into a base column and having been entered into at least one cell of a target column and a column header of the target column;
   determining a semantic relationship between at least one existing data item of the base column and the existing data item of the at least one cell of the target column and another semantic relationship between the at least one existing data item of the base column and the column header;
   determining at least one new data item to add to the target area of the spreadsheet based on the determined semantic relationships, wherein the determined at least one new data item has a semantic relationship with another existing data item of the base column that is the same as:
      the semantic relationship between the at least one existing data item of the base column and the at least one existing data item of the at least one cell of the target column; or
      the semantic relationship between the at least one existing data item of the base column and the column header of the target column; and
   populating the target area with the at least one new data item.

23. A method for improving efficiency in populating a spreadsheet with data, comprising:
   detecting existing data items having been entered by a user into a base column and a target column of the spreadsheet;
   suggesting at least one semantic relationship that exists between the base column and the target column, the at least one semantic relationship based on at least one existing data item of the base column and at least one existing data item of the target column; and
   receiving a selection of at least one suggested semantic relationship; and
   populating a target column with at least one new data item based on the selected at least one semantic relationship, wherein the at least one new data item has a semantic relationship with another existing data item of the base column that is the same as the selected semantic relationship.

24. The method of claim 23, wherein the target column is empty prior to population.

* * * * *